(12) United States Patent
Mangelsen et al.

(10) Patent No.: US 6,708,956 B1
(45) Date of Patent: Mar. 23, 2004

(54) BREAK AWAY BARRIER AND METHOD FOR USING SAME

(75) Inventors: Jan C. Mangelsen, Charlotte, IA (US); Kirk W. Roys, Le Claire, IA (US); Michael P. Skahill, Pleasant Valley, IA (US); Timothy A Scherer, Davenport, IA (US)

(73) Assignee: Genesis Systems Group, Ltd., Davenport, IA (US)

(*) Notice: Subject to any disclaimer, the term of this patent is extended or adjusted under 35 U.S.C. 154(b) by 115 days.

(21) Appl. No.: 10/114,836

(22) Filed: Apr. 3, 2002

(51) Int. Cl.[7] .................. B25J 19/06; E04H 17/00; F16P 1/02
(52) U.S. Cl. .............. 256/24; 256/26; 256/73; 49/394; 929/251.5
(58) Field of Search .............. 256/24, 25, 26, 256/73; 49/394, 501; 292/251.5

(56) References Cited

U.S. PATENT DOCUMENTS

| | | | | |
|---|---|---|---|---|
| 1,394,479 A | * | 10/1921 | Ewald | 256/73 |
| 4,645,183 A | * | 2/1987 | Rattray et al. | 256/25 |
| 4,659,902 A | * | 4/1987 | Swensrud et al. | 219/121.78 |
| 5,760,560 A | * | 6/1998 | Ohya et al. | 318/568.1 |
| 5,937,143 A | * | 8/1999 | Watanabe et al. | 700/264 |
| 6,438,455 B2 | * | 8/2002 | Matsumoto | 318/567 |

FOREIGN PATENT DOCUMENTS

| | | | | |
|---|---|---|---|---|
| DE | 4330718 C1 | * | 2/1995 | B25J/19/06 |
| JP | 11336996 A | * | 12/1999 | F16P/3/10 |

* cited by examiner

Primary Examiner—Lynne H. Browne
Assistant Examiner—Ernesto Garcia
(74) Attorney, Agent, or Firm—McKee, Voorhees & Sease, P.L.C.

(57) ABSTRACT

A break away barrier utilizes first and second spaced apart upstanding posts positioned a predetermined safe distance away from the outer movement limit of a robot. A pair of barrier assemblies are hinged to the first and second spaced apart upstanding posts and are hinged for movement from a closed position inside the safe distance to an open position outside the safe distance. A break away latch permits the opening and separation of the first and second barriers in response to a predetermined force.

7 Claims, 4 Drawing Sheets

BREAK AWAY BARRIER AND METHOD FOR USING SAME

BACKGROUND OF THE INVENTION

The present invention related to a break away barrier and method for using same.

Barriers have been provided around robotic equipment to protect workers from injury resulting by contact with the robotic equipment. Presently known barriers include a plurality of fixed posts which are attached to the support surface on which the robotic equipment is also supported. These fixed posts have barriers that extend between them. On occasion when the operator is working on or programming the robotic equipment, the worker must have access to the robotic equipment. In these situations, if the robotic equipment moves in an erratic fashion, it can sometimes pinch or crush the worker against one of the fixed posts or barriers thereby resulting in injury to the worker.

One solution for preventing this pinching action is to keep the fixed posts and barriers a predetermined safe distance outside the range of movement of the robotic equipment. Then if the robotic equipment moves in an erratic fashion it will not pinch the worker against the fixed posts or barriers. However, one disadvantage of positioning these fixed posts and barriers a safe distance away from the robotic equipment is that a larger "footprint" is needed for the barriers surrounding each robotic station. In manufacturing plants, the size of each footprint is very important to the efficient use of space within the plant. Therefore it is desirable to use as small a footprint as possible for the barriers surrounding the robotic station.

Therefore, a primary object of the present invention is the provision of an improved break away barrier and method for using same.

A further object of the present invention is the provision of a break away barrier that will break away and prevent pinching of the operator between the robotic equipment and the barriers.

A further object of the present invention is the provision of a break away barrier that has ease of access during an emergency stop of the robotic equipment.

A further object of the present invention is the provision of an improved break away barrier that improves the maintenance and programming access to the robotic equipment.

A further object of the present invention is the provision of an improved break away barrier and method for using same which utilizes a smaller overall footprint for the barrier surrounding the robotic station.

A further object of the present invention is the provision of an improved break away barrier and method for using same which reduces the cost by eliminating the number of fixed posts needed in prior devices.

A further object of the present invention is the provision of an improved break away barrier and method for using same which is efficient in operation, durable in use, and economical in manufacture.

BRIEF SUMMARY OF THE INVENTION

The foregoing objects may be achieved by a break away barrier for use with a work station mounted on a supporting surface and comprising a workpiece support for holding a workpiece and a robot mounted in a position to engage and perform work on the workpiece while the workpiece is on the workpiece support. The robot has an outer movement limit that defines the range of movement capability of the robot.

The break away barrier comprises first and second spaced apart upstanding posts fixed to the support surface and positioned a predetermined safe distance away from the outer movement limit of the robot. A first barrier assembly and a second barrier assembly each comprise one or more door panels. The first and second barrier assemblies are hinged to the first and second posts respectively for hinged movement from a closed position wherein the first and second barrier assemblies enclose the robot and are a closed distance less than the safe distance away from the outer movement limit of the robot to an open position wherein both the first and second barrier are an open distance greater than the safe distance away from the outer movement limit of the robot. A break away latch assembly holds the first and second barriers together when they are in their closed position. The latch assembly is responsive to a predetermined opening force urging the first and second barriers apart to break away and permit the first and second barriers to separate and move to a safe distance away from the outer movement of the movement limit of the robot.

The method for using the barrier comprises fixing the first and second posts to the support surface in spaced apart relationship to one another so that they are positioned a predetermined safe distance away from the outer movement limit of the robotic tool. Then the first and second barrier assemblies are mounted to the first and second posts respectively for hinged movement about their open and closed positions described above. The break away latch assembly holds the first and second barriers together when in the closed position and it breaks away in response to predetermined opening force urging the first and second barriers away from the robotic tool so as to permit the first and second barriers to separate and move to the safe distance away from the outer movement limit of the robot.

DETAILED DESCRIPTION OF THE INVENTION

Figure 1:
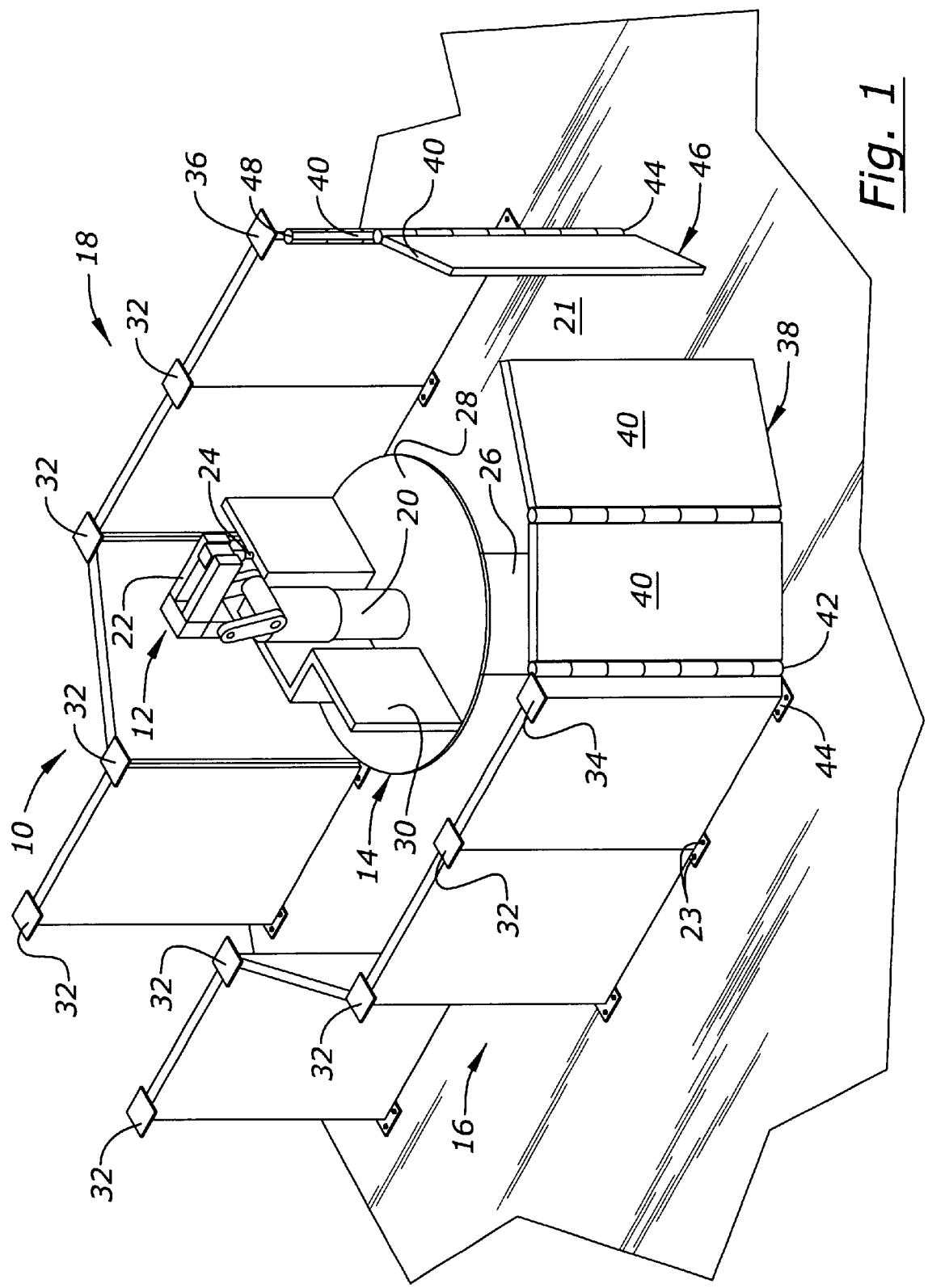
FIG. 1 is a perspective view of the work station utilizing the break away barrier of the present invention.

Referring to FIG. 1 the numeral 10 generally designates a work station. Work station 10 includes a robot assembly 12 surrounded by a work table 14 and first and second barrier assemblies 16, 18. The robot assembly 12 includes an upstanding column 20 which is fixed to the support surface or floor 21. At the top of upstanding column 20 is an articulated arm 22 having a tool 24 at its outer end. The arm 22 is capable of moving in a number of different directions about vertical axes, horizontal axes and axes which are parallel to the various arms in articulated arm 22. The result is an ability to move the tool 24 universally in any direction.

The robot assembly 12 is controlled by a computer system (not shown), and can be programmed to perform a number of functions on a workpiece which rests on a rotating table 28. The workpiece is not shown, but can be attached by various jigs to the rotating table 28. Table 28 rotates on a pedestal 26 and includes a diametric wall 30 extending across the diameter thereof.

Figure 2:
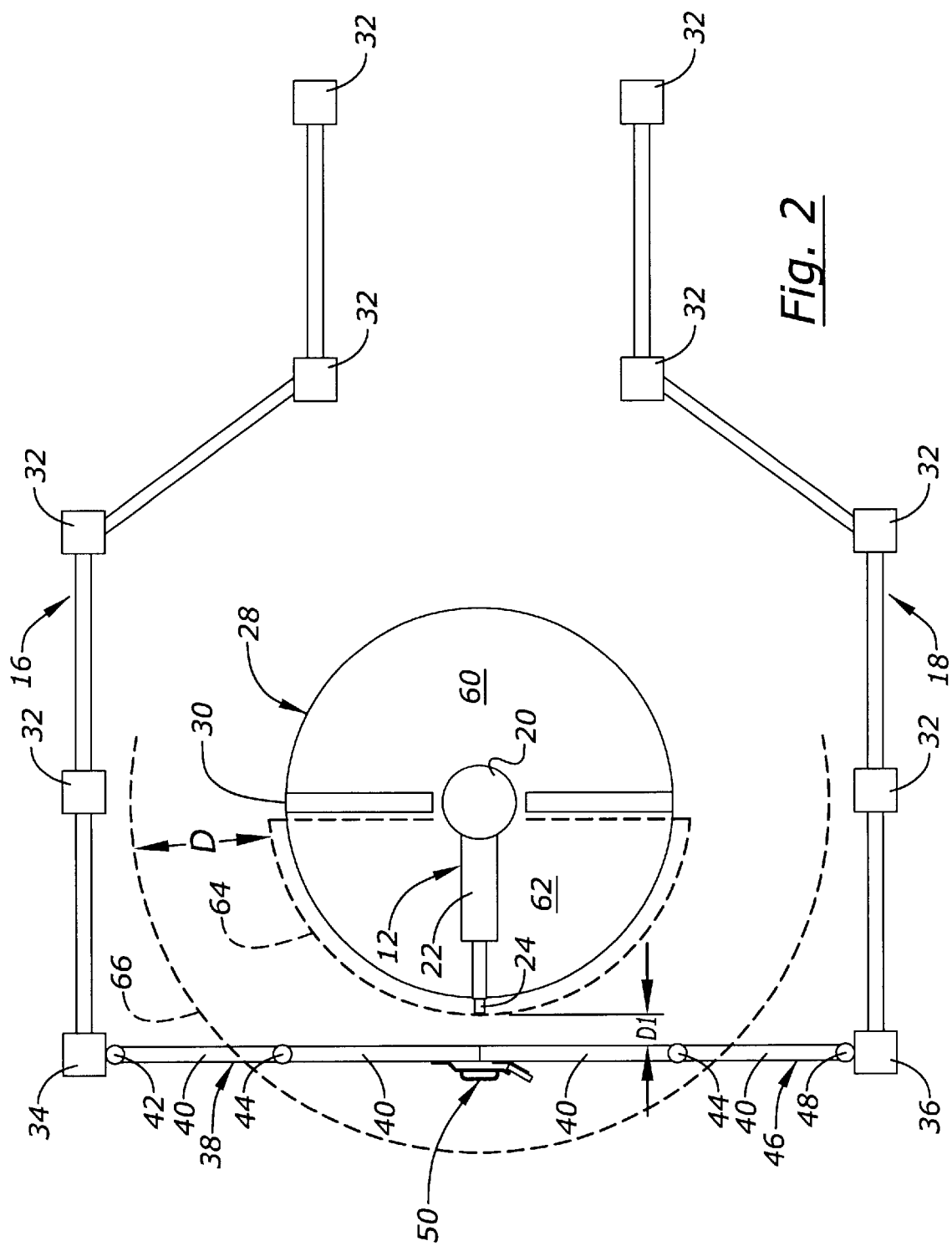
FIG. 2 is a top plan view of the work station showing the break away barriers in their closed position.

Referring to FIG. 2, the work table 28 includes a load surface 60 on one side of the panel 30 and a work surface 62 on the other side of the diametric wall 30. The table 28 is adapted to rotate on pedestal 26 at 180° intervals so that a workpiece can be placed on the load surface 60 and then indexed 180° from that position so that load surface 60 becomes a work surface 62 for receiving the operation performed by the robot 12.

Also referring to FIG. 2 it should be noted that the robot 12 is capable of moving the tool 24 to an extreme outer limit designated by the dotted line 64. The dotted line 64 is semicircular in shape, but various stops can be used with the robot 12 to change the shape of this outer limit. As a general rule however the outer limit of the robot is in a half circle.

Also shown in FIG. 2 is a dotted line 66 which represents the outer safe limit spaced a predetermined distance away from the outer movement limit 64. The distance between lines 64 and 66 is identified at D in FIG. 2. This distance may vary, but should be sufficient to allow for a person to be hit by the robot and still stay within the outer safe limit 66 without being pinched or squeezed against any posts or barriers. The preferred distance for distance D is approximately 18 inches, but this distance can be varied without detracting from the present invention.

Fixed to the support surface or floor 21 by bolts, rivets or other securing means 23 are a plurality of fixed posts 32. It should be noted that all of the posts 32 are outside the outer safe limit 66. A first hinged post 34 is fixed to the floor 21 and a second hinged post 36 is also attached to the floor in spaced relationship to the first hinged post 34. It should be noted that these two posts 32, 34 are also outside the outer safe limit 66. The particular shape or configuration of the barrier assemblies 16, 18 may be varied without detracting from the invention.

Hinged to the first hinge post 34 is a first hinged barrier 38. The hinged barrier 38 is hinged about a first primary hinge 42. The first hinge barrier 38 may be a single door or may be a multiple group of panels 40 which are hinged together by secondary hinges 44.

A second hinged barrier 46 is hinged to second hinge post 36 by means of a second primary hinge 48. The second hinged barrier 46 also may be a single door or may be a plurality of door panels 40 hinged together by secondary hinges 44. For larger door panels, casters may be provided to support the weight, for example at the outer edges of the panels 40 or at the hinges 44.

Figure 4:
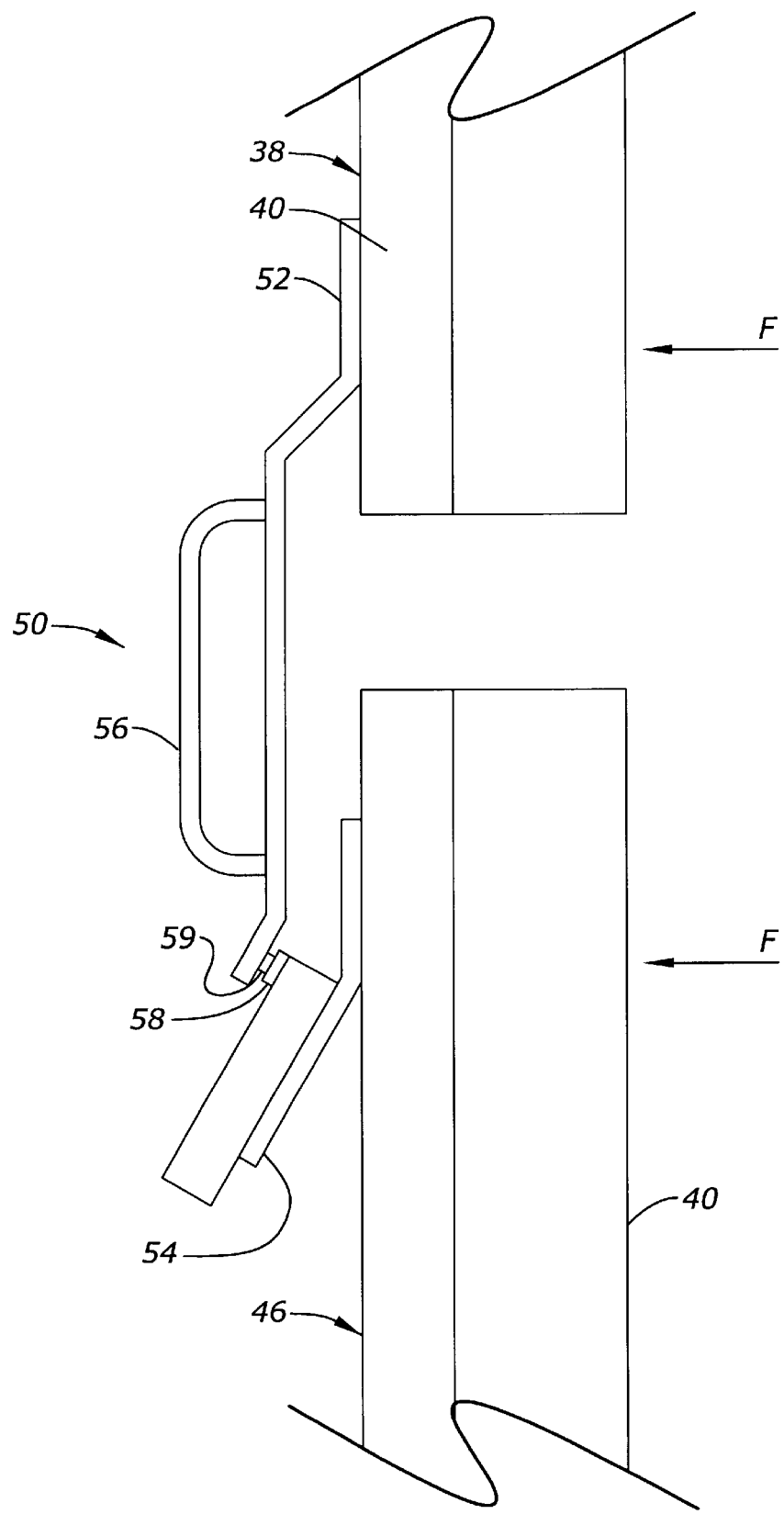
FIG. 4 is an enlarged detail view of the break away latch assembly which holds the two barrier assemblies together when they are in their closed position.

In FIG. 2 the edges of the first and second hinged barriers 38, 46 are joined together by means of a break away latch 50. Breakaway latch 50 is shown in detail in FIG. 4 and includes a first latch member 52 attached to the barrier assembly 38 and a second latch member 54 attached to the second barrier assembly 46. The first latch 52 includes a handle 56 thereon, and the second latch member 54 includes a detent 58 thereon which releasably attaches to a corresponding plunger 59 on the first latch member 56.

Alternative, the latch 50 could be magnetic, with a magnet on one of the latch members 52, 54 and a metallic part on the other member.

Figure 3:
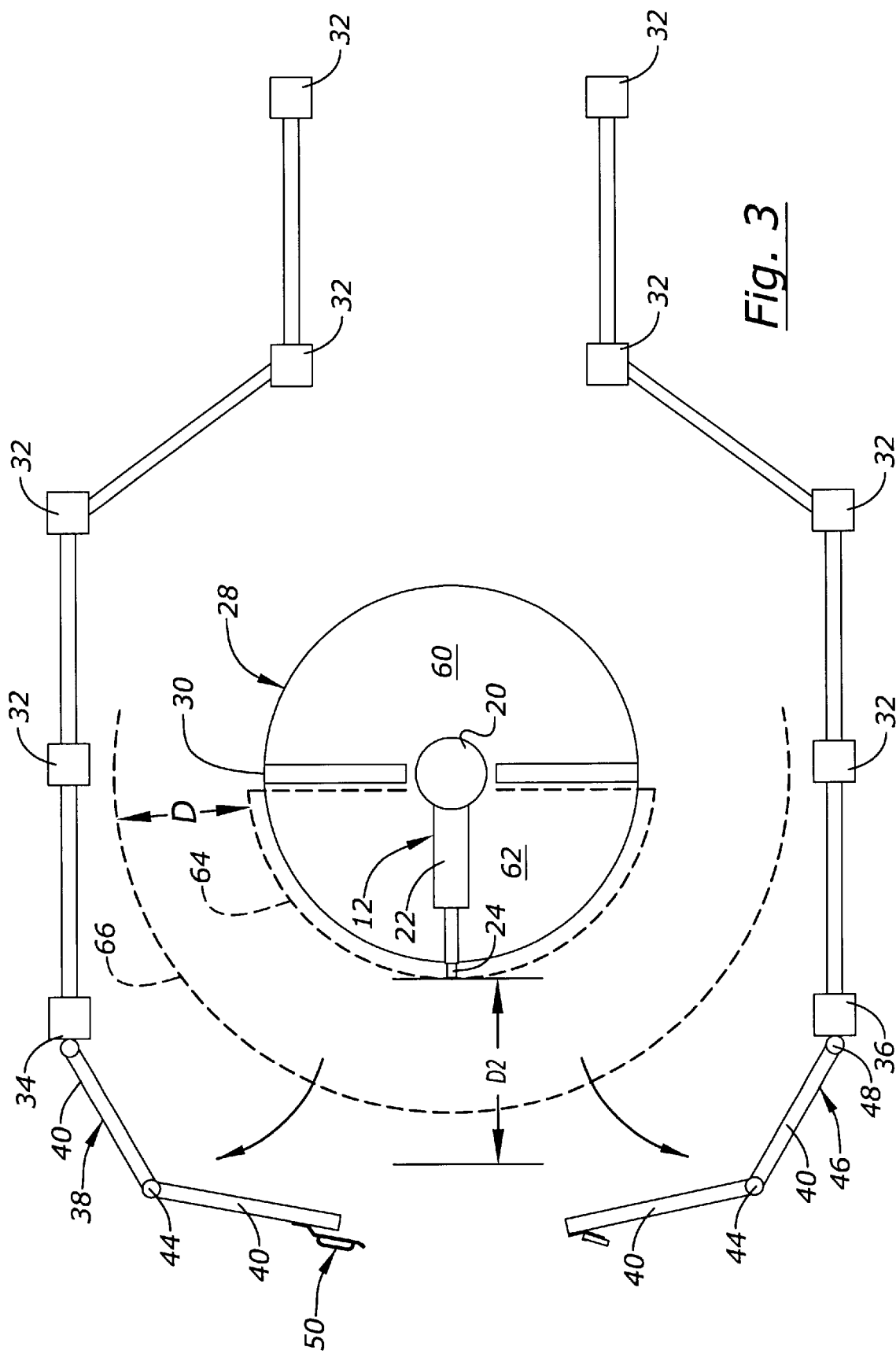
FIG. 3 is a view similar to FIG. 2, but showing the break away barriers in their open position.

The attachment of the latch members 52, 54 by means of detent 58 permits the latch assembly 50 to be a break away latch assembly. In response to a force F on either barrier assembly 38, 46 or on both of the barrier assemblies 38, 46, the latch 50 becomes disengaged. This is an important function of the barriers 38, 46 because the force F is chosen such that if a person is between the robot 12 and the barriers 38, 46, and the robot 12 forces the person against the barriers 38, 46, the latch will release and the barriers will move from their closed position shown in FIG. 2 to their open position shown in FIG. 3. As can be seen in FIG. 2, the barrier assemblies 38, 46, when in their closed position, are at a closed distance D1 inside the safe limit 66, but when they move to their open position shown in FIG. 3 they are completely at an open distance D2 outside the safe area 66. This prevents the operator from being pinched between the robot 12 and the barriers 38, 46, when the barriers 38, 46 are in their closed position.

Several advantages are obtained by the break away barriers 38, 46 and the latch assembly 50. Pinch points between the robot and fixed posts or barriers are eliminated. Instead of pinching the operator between the barriers 38, 46, the barriers give way and permit the operator to move out of the path of the robot 12.

Another advantage is the ease of emergency stop of the robot 12. If a problem develops the operator can open the barriers 38, 46 merely by pulling on the handle 56. Preferably the latch assembly 50 will have a cutout switch that disables the robot any time the latch assembly 50 is broken away. The operator has ease of access both for maintenance and for programming the robot.

Another advantage is that a smaller footprint is obtained for the entire work station 10. If fixed barriers were used instead of the hinged barriers 38, 46, they would need to be outside the circle 66, thereby making a smaller overall foot print.

Another advantage is the reduced cost achieved by eliminating one or more fixed posts such as the posts 32.

The particular configuration of the table 28 and the robot 12 can be changed without affecting the invention. For example a holding device entirely different from table 28 may be used to hold the workpiece. Similarly an entirely different robot configuration, or more than one robot may be used.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing form the spirit or scope of the invention as further defined in the following claims.

What is claimed is:

1. A breakaway barrier for use with a work station mounted on a support surface and comprising a work piece support for holding a work piece, and a robot mounted in a position to engage and perform work upon the work piece while the work piece is on the work piece support, the robot having an outer movement limit that defines the range of movement capability of the robot; the breakaway barrier comprising;

first and second spaced apart upstanding posts positioned a predetermined safe distance away from the outer movement limit of the robot;

a first barrier assembly and a second barrier assembly, each comprising one or more door panels;

the first and second barrier assemblies being hinged to the first and second posts, respectively, for hinged movement from a closed position wherein the first and second barrier assemblies are a closed distance less than said safe distance away from the outer movement limit of the robot to an open position wherein both said first and second barriers are free from engagement with one another and are an open distance greater than the safe distance away from the outer movement limit of the robot;

a breakaway latch assembly holding the first and second barriers together when in the closed position, the latch assembly being responsive to a predetermined opening force urging the first and second barriers apart to break away and permit the first and second barriers to separate and move to the safe distance away from the outer movement limit of the robot.

2. A breakaway barrier according to claim 1 wherein the latch assembly comprises first and second latch members on the first and second barrier assemblies, respectively, and means detachably holding the first and second latch members together.

3. A breakaway barrier according to claim 2 wherein the means comprises a detent.

4. A breakaway barrier according to claim 1 wherein the first and second barriers comprise only one door panel each.

5. A breakaway barrier according to claim 1 wherein the first and second barriers each comprise more than one door panel, each of the door panels within the first and second barriers being hinged to one another.

6. In combination:

a support surface;

a robotic tool on the support surface and having a range of movement including an outer movement limit;

first and second spaced apart upstanding posts positioned a predetermined safe distance away from the outer movement limit of the robot;

a first barrier assembly and a second barrier assembly, each comprising one or more door panels;

the first and second barrier assemblies being hinged to the first and second posts, respectively, for hinged movement from a closed position wherein the first and second barrier assemblies are a closed distance less than said safe distance away from the outer movement limit of the robot to an open position wherein both said first and second barriers are free from engagement with one another and are an open distance greater than the safe distance away from the outer movement limit of the robot;

a breakaway latch assembly holding the first and second barriers together when in the closed position, the latch assembly being responsive to a predetermined opening force urging the first and second barriers apart to break away and permit the first and second barriers to separate and move to the safe distance away from the outer movement limit of the robot.

7. A method for making a barrier around a robotic tool on a support surface, the robotic tool having a range of movement that defines an outer movement limit, the method comprising:

positioning first and second posts in spaced apart relation to one another and a predetermined safe distance away from the outer movement limit of the robotic tool;

mounting first and second barrier assemblies to the first and second posts respectively for hinged movement from a closed position wherein the first and second barrier assemblies are a closed distance less than the safe distance away from the outer movement limit of the robotic tool, to an open position wherein both of the first and second barrier assemblies are free from engagement with one another and are an open distance greater than the safe distance away from the outer movement limit of the robotic tool;

using a breakaway latch assembly to hold the first and second barriers together when in the closed position;

breaking away the latch assembly in response to a predetermined opening force urging the first and second barriers away from the robotic tool so as to permit the first and second barriers to separate and move to the safe distance away from the outer movement limit of the robot.

* * * * *